United States Patent [19]
Dennis et al.

[11] Patent Number: 5,168,470
[45] Date of Patent: Dec. 1, 1992

[54] APPARATUS FOR ROTATING A TRANSDUCER ASSEMBLY OF A BOREHOLE LOGGING TOOL IN A DEVIATED BOREHOLE

[75] Inventors: Charles L. Dennis; Denis P. Schmitt, both of Richardson, Tex.

[73] Assignee: Mobil Oil Corporation, Fairfax, Va.

[21] Appl. No.: 824,929

[22] Filed: Jan. 23, 1992

[51] Int. Cl.$^5$ .......................... G01V 1/40; G01V 1/16
[52] U.S. Cl. ........................ 367/31; 367/25; 367/911; 181/104; 181/105
[58] Field of Search ................ 367/25, 31, 911; 181/102, 104, 105; 175/45; 73/151

[56] References Cited

U.S. PATENT DOCUMENTS

| Re. 24,446 | 3/1958 | Summers | 181/0.5 |
|---|---|---|---|
| 3,333,238 | 7/1967 | Caldwell | 340/18 |
| 3,362,011 | 1/1968 | Zemanek, Jr. | 340/18 |
| 3,614,891 | 10/1971 | Nolte | 73/151 |
| 4,383,308 | 5/1983 | Caldwell | 367/31 |
| 4,414,656 | 11/1983 | Hepp | 367/25 |
| 4,479,564 | 10/1984 | Tanguy | 175/45 |
| 4,649,525 | 3/1987 | Angona et al. | 367/31 |
| 4,736,348 | 4/1988 | Bednarczyk | 367/28 |
| 4,800,981 | 1/1989 | Uttecht et al. | 181/104 |
| 4,829,488 | 5/1989 | Siegfried | 181/105 |
| 4,832,148 | 5/1989 | Becker et al. | 181/104 |
| 5,001,676 | 3/1991 | Broding | 367/31 |
| 5,058,077 | 10/1991 | Twist | 73/151 |
| 5,121,363 | 6/1992 | Benzing | 367/35 |

OTHER PUBLICATIONS

"Eccentric dipole sources in fluid-filled boreholes: Numerical and Experimental Results", H. D. Leslie and C. J. Randall, *J. Acoust. Soc. Am.*, Jun. 1990, pp. 2405-2421.

*Primary Examiner*—Nelson Moskowitz
*Attorney, Agent, or Firm*—Alexander J. McKillop; Charles J. Speciale; George W. Hager, Jr.

[57] ABSTRACT

A borehole logging tool having a dipole acoustic energy source and at least one spaced-apart dipole acoustic energy receiver is lowered into a deviated borehole. A motor rotates the source and receiver about the axis of the borehole tool. A first signal is produced representing source and receiver rotational position relative to rotational position of the borehole tool. A second signal is produced representing rotational position of the borehole tool relative to a vertical direction. A comparator produces a third signal of the difference between the first and second signals as a representation of source and receiver rotational position relative to the vertical direction. The motor rotates so as to minimize such third signal, thereby rotating the focus of the source and receiver in a direction perpendicular to the eccentricity of the borehole tool in the deviated borehole.

7 Claims, 6 Drawing Sheets

APPARATUS FOR ROTATING A TRANSDUCER ASSEMBLY OF A BOREHOLE LOGGING TOOL IN A DEVIATED BOREHOLE

BACKGROUND OF THE INVENTION

It has long been known to acoustically log open wellbores to determine the velocities of compression ("P") waves and shear ("S") waves traveling through rock formations located in the wellbore region. Logging devices have been used for this purpose which normally comprise a sound source (i.e., transmitter) and one or more receivers disposed at preselected distances from the sound sources. The use of remotely spaced, multiple receivers is intended to aid in distinguishing between various arriving wave fronts since travel time differentials increase with increasing distance from the transmitter, as described in U.S. Pat. No. 4,383,308 to R. L. Caldwell.

Such arriving wave fronts generally include both headwaves and guided waves. A first arriving event is the headwave commonly called a compressional wave which represents acoustic energy which has been refracted through the formation adjacent the wellbore. This compressional wave travels as a fluid pressure wave in the wellbore mud from the transmitter to the formation where it travels at the compressional wave velocity of the particular formation. The compressional wave then travels to the receiver through the wellbore mud as a fluid pressure wave.

A second arriving event is the headwave commonly called a shear wave which is also refracted through the formation adjacent the wellbore. Unlike the compressional wave, the shear wave travels at shear velocity through the formations. The particles of the formation along the path of propagation are vibrated in a direction perpendicular to the direction of the propagation of the wave.

A third arriving event is the guided wave commonly called a tube wave or Stoneley wave which causes a radial bulging and contraction of the borehole and its travel is, therefore, associated with the borehole wall, that is, the boundary between the borehole fluids and the formation solids.

A fourth arriving event is the guided wave commonly called a normal mode, pseudo-Rayleigh wave, or reflected conical wave. The travel of this normal mode is restricted to the borehole and has an oscillatory pattern normal to its direction of travel. Normally, the shear wave is indistinguishable from the onset of this normal mode due to concurrent arrival times.

Various signal timing and wave front analysis methods have also been suggested for distinguishing between these various wave fronts received at a given receiver. Most of these methods involve timing circuits which anticipate the receipt of, and facilitate the collection of, such wave front information. For descriptions of various logging techniques for collecting and analyzing acoustic wave data, please refer to U.S. Pat. No. 3,333,238 (Caldwell); U.S. Pat. No. 3,362,011 (Zemanek, Jr.); Reissue U.S. Pat. No. 24,446 (Summers); and U.S. Pat. No. 4,383,308 (Caldwell).

In the design of such acoustic logging tools, various types of transmitters, such as piezoelectric or magnetostrictive transmitters, have been suggested for creating the acoustic logging signals. For conventional logging operations, most such transmitters have been centrally located in the borehole, and have been adapted to generate sound which is radiated in a multidirectional (360°) pattern from the transmitter to adjacent wellbore surfaces. Such transmitters are well suited for creating compression waves in surrounding rock and sand formations.

Recently, attention has been directed to developing transmitters which are particularly suited to shear wave logging. Such transmitters generally attempt to achieve a single point force application of sound energy to the borehole wall. The theory behind point force transmitters is that they are capable of directly generating shear waves. Conventional multidirectional transmitters are said to be capable only of indirectly creating shear waves. Point force type transmitters produce shear waves of substantially higher amplitudes than heretofore possible with conventional multidirectional compression wave transmitters. Accordingly, formations such as loosely consolidated or unconsolidated sand, for which shear waves cannot be refracted back into the hole to permit definitive detection using conventional compression wave receivers, may now be shear wave logged with these shear wave logging systems. U.S. Pat. No. 4,049,525 to Angona and Zemanek, Jr. describes a shear wave acoustic logging system employing such a point force transmitter for the shear wave generation.

SUMMARY OF THE INVENTION

In accordance with the present invention there is provided a borehole logging tool for acoustic shear wave logging of a subsurface formation penetrated by a deviated borehole. A dipole acoustic energy source is mounted for rotation about the axis of a borehole logging tool so as to focus the directivity of acoustic energy such that it is perpendicular to the axis of the borehole tool. At least one axially spaced-apart dipole acoustic energy receiver is mounted for rotation about the axis of the borehole tool to focus the reception of acoustic energy in the same direction as the focusing of the source. A motor is mechanically coupled to the source and receiver for rotating the source and receiver about the axis of the borehole tool. A first signal is produced representing the source and receiver rotational positions relative to the rotational position of the borehole tool within the deviated borehole. A second signal is produced representing the rotational position of the borehole tool within the deviated borehole relative to a vertical direction. A comparator produces a third signal of the difference between such first and second signals representing the rotational position of the source and receiver relative to a vertical direction. This third signal is applied to the motor to cause it to rotate the source and receiver to a position that minimizes the third signal so as to maintain the focus of the source and receiver in a horizontal direction that is perpendicular to the direction of eccentricity of the borehole tool with respect to the borehole axis.

In one aspect, the first signal is produced by a first potentiometer having a stator and a movable rotor. The stator is affixed to the housing of the borehole tool while the rotor is mechanically coupled to the source and receiver. The rotational position of the rotor provides a voltage output from the first potentiometer representing rotational position of the source and receiver relative to the borehole tool. The second signal is produced by a second potentiometer with its stator affixed to the housing of the borehole tool and its rotor mechanically coupled to a gimbal mounted weight which moves the rotor in response to the vertical pull of gravity on the weight. The rotational position of the rotor provides a voltage output from the second potentiometer representing rotational position of the borehole tool relative to a vertical direction. The third signal is produced by an operational amplifier that subtracts such first and second signals.

In another aspect, the first signal is produced by a first digital shaft encoder fixed to the housing of the borehole tool and to the source and receiver. The rotational position of the encoder provides an output representing rotational position of the source and receiver relative to the borehole tool. The second signal is produced by a second digital shaft encoder fixed to the housing of the borehole tool and mechanically coupled to a gimbal mounted weight to cause the encoder to produce an output representing rotational position of the borehole tool relative to a vertical direction. The third signal is produced by a microprocessor that subtracts such first and second signals.

DESCRIPTION OF THE PREFERRED EMBODIMENT

In unconsolidated subsurface formations, borehole logging tools have used a dipole acoustic energy source and a plurality of spaced-apart dipole acoustic energy receivers to generate and record the flexural mode associated with a pure bending of the borehole whose low frequency part propagates at the shear velocity of the unconsolidated formation. In such an unconsolidated formation, shear velocity is less than the acoustic velocity of the borehole fluid and the logging tool provides a direct measure of the shear velocity in contrast to the borehole logging tools employing monopole acoustic energy source and receivers.

However, a great portion of the boreholes are cased with steel lining and cement. In such a cased borehole the flexural mode, i.e., shear wave, generated by a dipole acoustic energy source in an unconsolidated formation is often obscured by a high amplitude tube wave traveling at a velocity close to the acoustic velocity of the borehole fluid.

An off-center, or eccentrically positioned dipole acoustic energy source generates several modes, among which is the tube wave. In an open hole, i.e., uncased, the tube wave is strongly coupled to an unconsolidated formation and propagates at a velocity close to that of the shear wave velocity of the unconsolidated formation. This results in interferences which do not critically interfere with the determination of the shear wave velocity (see "Eccentric dipole sources in fluid-filled boreholes: Numerical and experimental results", by Leslie and Randall, *J. Acoust. Soc. Am.*, June 1990, pgs. 2405–2421). Mainly the amplitude is altered as it may not decrease monotically with increasing source-to-receiver distance. However, in cased boreholes, the tube wave propagates at a velocity close to the acoustic velocity of the borehole fluid. Therefore, for a cased unconsolidated formation, the tube wave will always arrive before the shear wave, thereby interfering with its determination.

It is therefore an object of the present invention to provide for the acoustic shear wave logging of a subsurface unconsolidated formation surrounding a cased borehole that minimizes such tube wave interference on the detection of shear waves.

Figure 1:
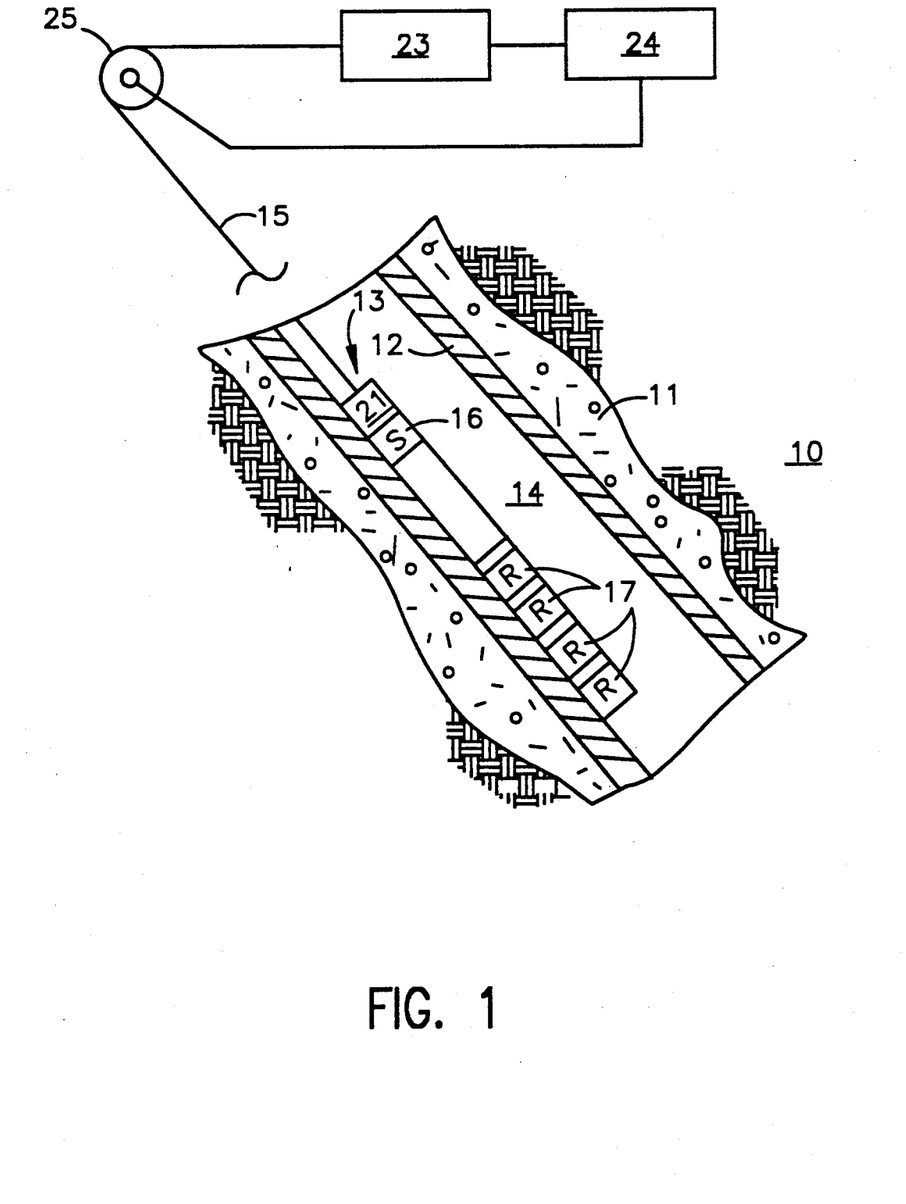
FIG. 1 illustrates a borehole logging tool eccentrically positioned within a cased unconsolidated formation for conducting a shear wave acoustic logging of such formation in accordance with the present invention.

Referring now to FIG. 1, there is illustrated a borehole logging tool useful in carrying out the present invention. An unconsolidated formation 10 is penetrated by a borehole 14 which is deviated from the vertical and is lined with steel well-casing 12 and cement 11. A borehole logging tool 1 is suspended within the deviated borehole 14 by cable 15. The force of gravity causes the borehole tool 13 to rest against, or in juxtaposition with, the well casing 12 in the case of a deviated or horizontal borehole. A dipole acoustic energy source 16 generates asymmetrical acoustic energy which travels by way of the fluid within the borehole and the surrounding cased formation as compressional, tube and shear waves to a plurality of spaced-apart dipole acoustic energy receivers 17.

Figure 2:
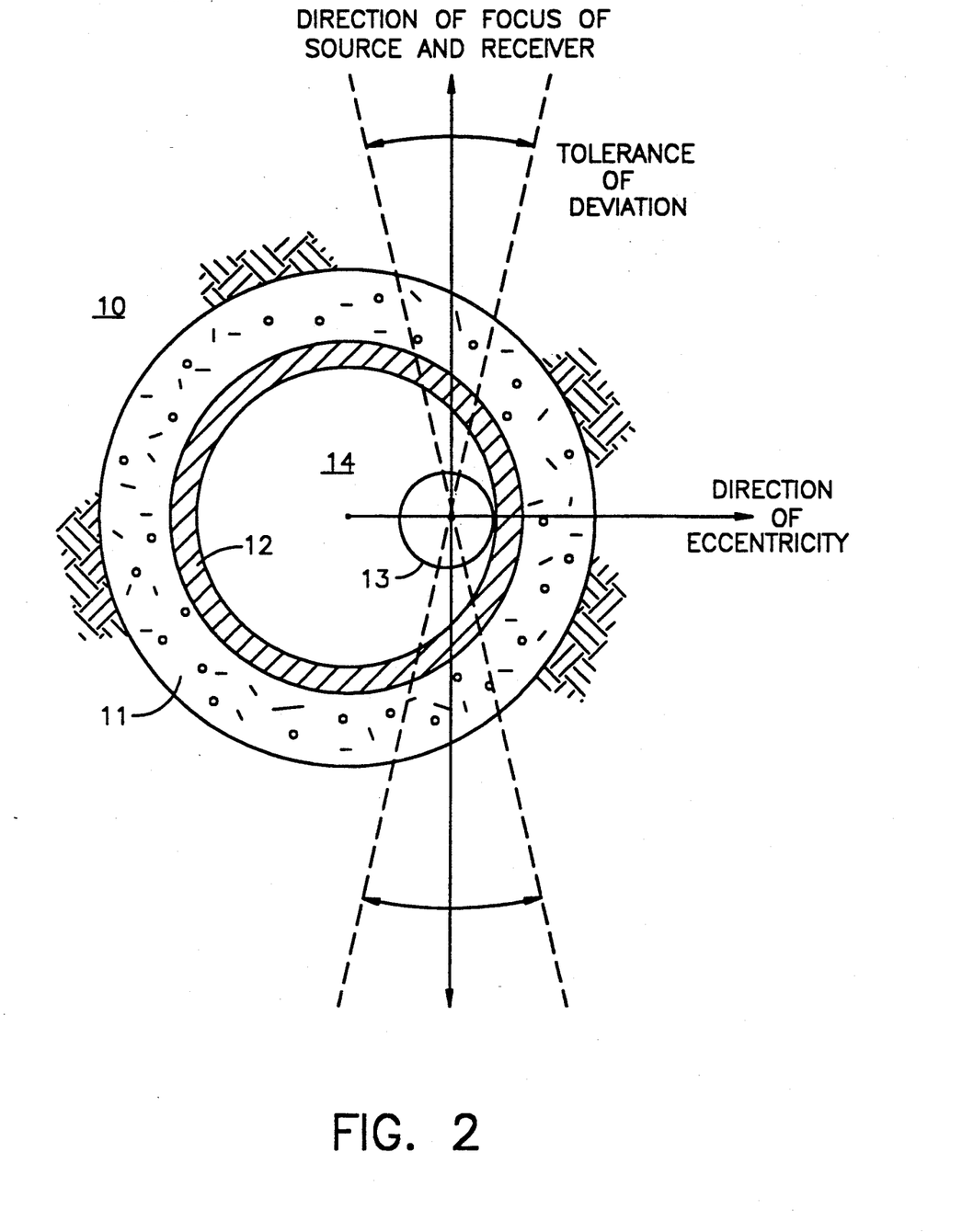
FIG. 2 is a top view of the borehole logging tool and cased unconsolidated formation of FIG. 1 showing the directions for the asymmetrical acoustic energy action of the dipole source and for the sensitivities of the dipole receiver of FIG. 1.

To carry out the present invention with the borehole logging tool of FIG. 1, the off-centered borehole tool 13 is oriented, as shown in FIG. 2, so that the directions of focus for the asymmetrical acoustic energy action of the dipole source 16 and for the sensitivities of the dipole receivers 17 are perpendicular to the axis of the borehole tool as well as perpendicular to the direction of tool eccentricity. Such configuration allows the present invention to minimize the effect of interfering tube waves on the recorded shear waves since both the source and receivers point in the same direction (i.e. parallel directions) and such direction is perpendicular to the direction of eccentricity of the logging tool within the borehole. Such minimizing effect can be seen in FIG. 3 wherein the amplitude of the recorded tube wave is minimized with both source action and receiver sensitivity directed perpendicular to the direction of tool eccentricity which has been set equal to zero. It can be further seen that the tube wave amplitude decrease phenomenon is efficient within a deviation of about ±20 around the direction perpendicular to that of the eccentricity (e.g. 90°). It is noted that the directions of source action and receiver sensitivity with respect to the direction of eccentricity (i.e. 0°) are illustrated along the ordinate of FIG. 3. In contrast, tube wave amplitude is maximized when both the source action and receiver sensitivities are directed parallel to the direction of tool eccentricity (e.g. 0° or 180°).

Figure 3:
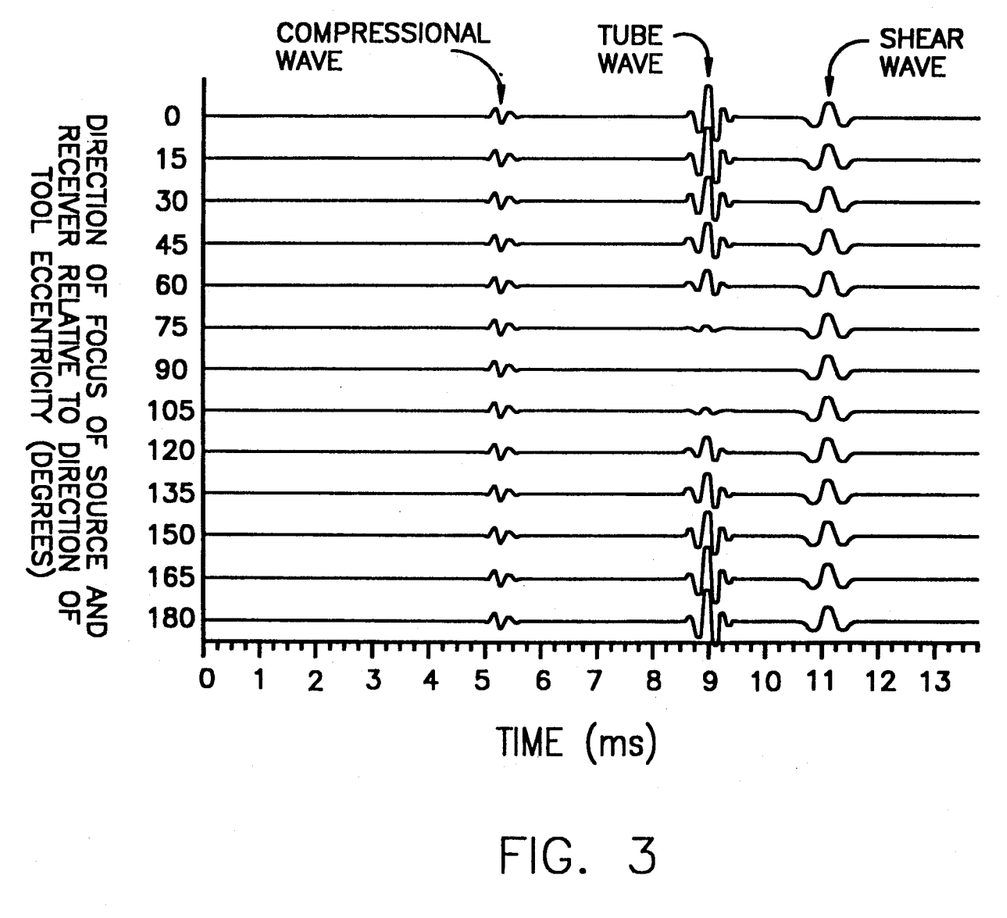
FIG. 3 illustrates receiver signal amplitudes with the dipole source action and the receiver sensitivities of FIG. 1 acting in the same direction at various angles to the direction of tool eccentricity within the borehole as illustrated in FIG. 2.

FIG. 3 is illustrative of recorded acoustic waves within a borehole of 6.35 cm. inner radius and a 1.3 cm. offset of the source and receiver. The source and receiver spacing is 12 meters and the source has a center frequency of 3 kHz. The steel casing is 0.80 cm. thick and the cement sheath is 3.645 cm. thick.

In a further aspect, the amplitude of the tube wave increases compared to that of the compressional and shear waves, whatever the orientation of the source and receivers, within increasing values of logging tool eccentricity within the borehole. The same phenomenon is observed with increasing borehole radius. Also, with a shorter source-to-receiver spacing or a more ringing source wave form of longer duration in time, the effects of the tube wave will be enhanced so that the shear wave signal can be totally obscured. It is important to note that a high amplitude tube wave may lead to a decrease in system gain so that the shear wave signal may not be detectable in the presence of noise.

Similar results have been obtained when changing the casing, the cement, and the formation characteristics. When the formation is fast (i.e., its shear wave velocity is greater than the acoustic velocity of the borehole fluid) the tube wave arrives later than the shear wave and does not obscure it.

Referring again to FIG. 1, there is shown a rotating motor assembly 21 for rotating the source 16 and the receivers 17 so that they will act along a direction perpendicular to the direction of eccentricity. Signals from the borehole tool 13 are transmitted uphole by conductors within cable 15 to any suitable utilization system at the surface of the earth. For example, the utilization system is illustrated as comprising an uphole analysis and control circuit 23 and a recorder 24 in order that the output from circuit 23 may be correlated with depth as indicated from a depth measuring sheath 25.

The dipole acoustic energy source 16 and the dipole acoustic energy receivers 17 may preferably take the form of the bender-type described in the aforementioned U.S. Pat. No. 4,649,525 to Angona and Zemanek, Jr., the teaching of which is incorporated herein by reference. The bender disc is highly directional with peak sensitivity in the direction perpendicular to the disc face. In the present invention, such discs will be mounted with their faces in the same direction parallel to the axis of the tool and will be rotated by the downhole gyroscope motor system so as to be perpendicular to the direction of tool eccentricity within the borehole as detected by the downhole sensor.

Having described the apparatus of the present invention in conjunction with FIG. 1, the rotating motor assembly 21 that rotates the source 16 and receivers 17 so that they are focused perpendicular to the axis of the logging tool and to the direction of eccentricity of the logging tool in the borehole will now be described in detail in conjunction with FIGS. 4-6.

Figure 4:
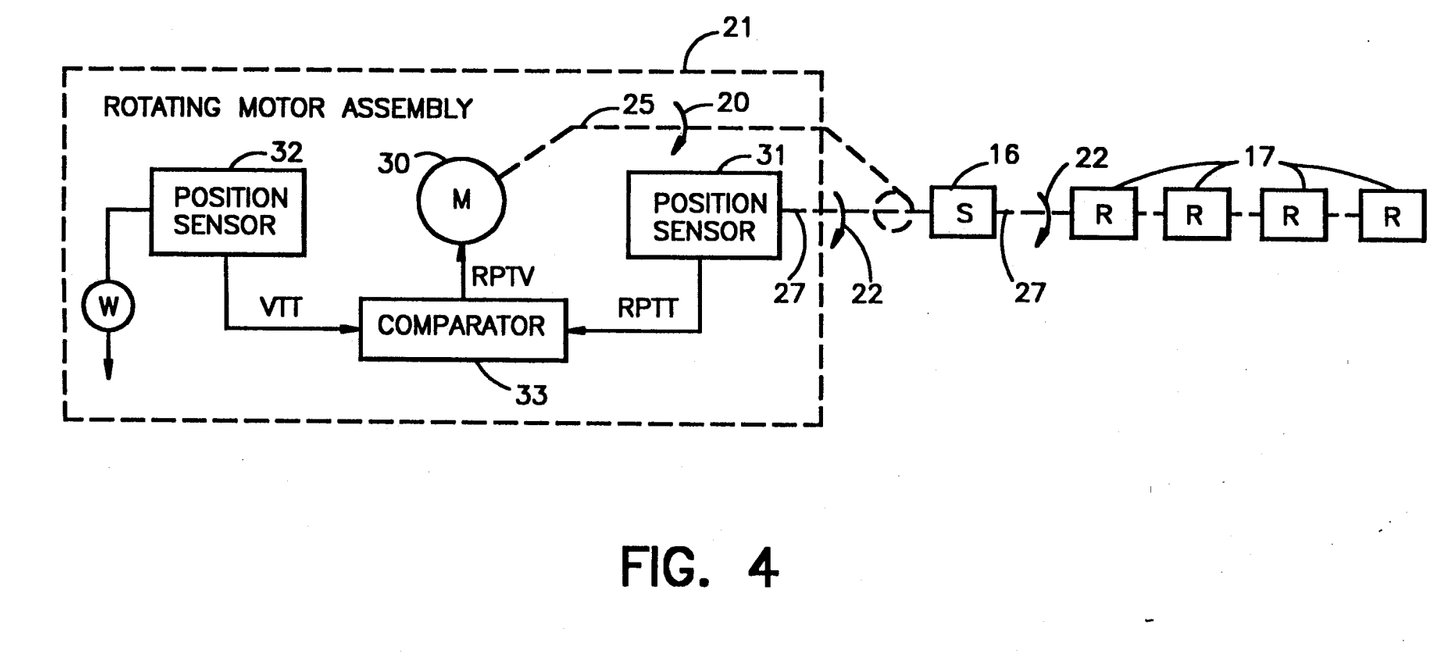
FIGS. 4–6 are electrical schematics of portions of the borehole logging tool of FIG. 1.

Referring to FIG. 4, a motor 30 is rotatably coupled, as shown by dashed line 25 and arrow 20, to acoustic energy source 16 and to acoustic energy receivers 17. Sensor 31 rotates along with source 16 and receivers 17, as shown by dashed lines 27 and arrows 22, and outputs a source and receiver rotational position-to-tool housing signal RPTT. A sensor 32 outputs a vertical-to-tool housing signal VTT that represents the rotational position of the borehole tool within the deviated borehole relative to a vertical position. Comparator 33 determines the difference between these two signals VTT and RPTT and rotates motor 30 so as to minimize such difference and thereby maintain the focus of the source and receivers in a horizontal direction which, in the case of a deviated borehole with the logging tool lying in juxtaposition with the lower side of the borehole from the force of gravity, is in a direction perpendicular to the axis of the borehole tool and to the direction of eccentricity of the logging tool within the borehole.

Figure 5:
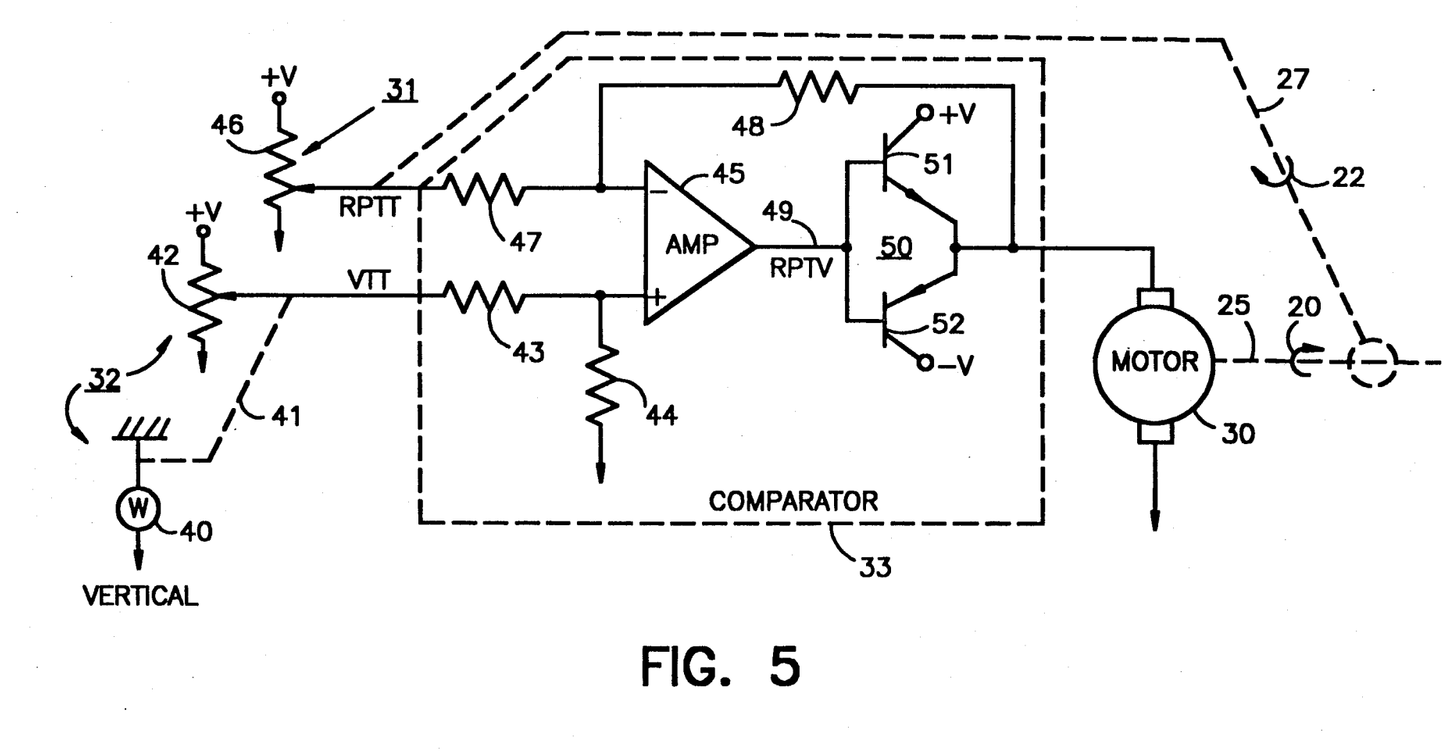
Figure 6:
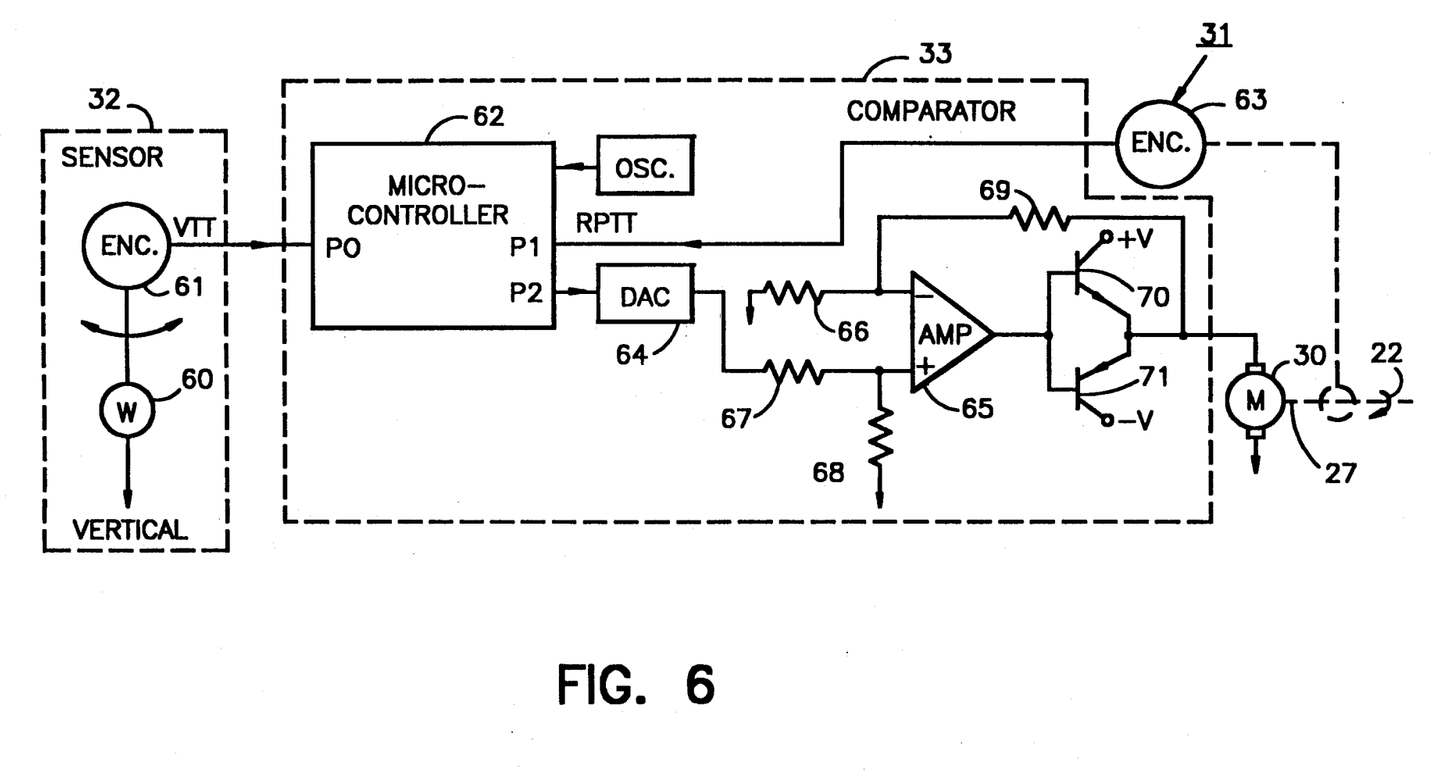

Rotating motor assembly may operate in accordance with the present invention in either an analog mode as shown in FIG. 5 or in a digital mode as shown in FIG. 6.

Referring firstly to FIG. 5, there is illustrated an analog servomechanism mode of operation. Sensor 32 comprises a gimbal mounted weight 40 which mechanically moves by way of coupling 41 the rotor of a potentiometer 42. This serves to provide a signal VTT which is a vertical reference relative to the stator of the potentiometer 42 which is affixed to the logging tool housing. A voltage proportional to the angular position of the potentiometer 42 is input to comparator 33 through resistor networks 43 and 4 to the non-inverting input of difference amplifier 45. Similarly, sensor 31 comprises a potentiometer 46 which is mechanically coupled to, and rotates with, the motor 30, the source 16 and receivers 17 (as shown by dashed line 27 and arrow 22). The stator of potentiometer 46 is also affixed to the logging tool housing. A signal RPTT having a voltage proportional to the angular position of potentiometer 46 is input to comparator 33 through resistor network 47 and 48 to the inverting input of difference amplifier 45. Amplifier 45 determines the difference of the two potentiometer outputs to produce an analog signal on line 49 which represents the difference of the vertical reference-to-tool housing signal VTT minus the receiver position-to-tool housing signal RPTT. This analog difference signal removes the tool housing position so that a receiver position-to-vertical reference signal RPTV applies to amplifier 50 which drives motor 30 through current amplifying transistors 51 and 52 in a direction to minimize the difference between the signals VTT and RPTT. Any difference detected by amplifier 45 is amplified to improve the response speed of the operation.

Referring now to FIG. 6, there is illustrated a digital servomechanism mode of operation. Sensor 32 comprises a gimbal mounted weight 60 which mechanically moves the digital shaft encoder 61, which is affixed to the logging tool housing to output a vertical reference-to-tool housing signal VTT which is an absolute 8-bit binary word depending on the angular shaft position of the encoder. This signal VTT is input to the PO port of an 8-bit microcontroller 62. Input to the PI port is a receiver position-to-tool housing signal RPTT which is an 8-bit binary word from digital shaft encoder 63 of sensor 31. Digital shaft encoder 63 is mechanically coupled to and rotates with the motor 30, the source 16 and receivers 17 (as shown by dashed line 27 and arrow 22). Microcontroller 62 determines the difference RPTV between signal VTT and signal RPTT in accordance with the following assembly source code designed for an Intel 8751/87C51 microcontroller with on-board eprom:

| | |
|---|---|
| ORG 00H | |
| START | : start point at 00h (8751 resets to this point), |
| SJMP MAIN | : jump to main start-of-code and start, |
| ORG 30H | : begin code beyond interrupts, |
| MAIN | : heart of code starts here, |
| MOV A,PO | : put reference position encoder in accumulator, |
| SUBB A,PI | : subtract xdcr position encoder from reference, |
| ADDC A,#1000000 B | : add half scale to result (makes |

| | |
|---|---|
| MOV P2,A | bipolar output),<br>: move result to dac/motor output port, |
| SJMP MAIN | : go back to start of code and repeat, |
| END | |

An 8-bit digital-to-analog convertor 64 converts the 8-bit word from controller 62 to an analog voltage that is amplified by operational amplifier 65 and associated resistors 66-69 and transistors 70-71 and is thereafter applied to motor 30.

It is to be understood that the circuit components illustrated in FIGS. 5 and 6 are merely representative of alternate embodiments of the present invention. Particularly with respect to the embodiments of FIGS. 5 and 6, various types and values of circuit components may be utilized. In accordance with such embodiments the following sets forth specific types and values of the circuit components.

| Reference Designation | Description |
|---|---|
| DC Gear Motor 30 | Globe #C43A113-1 |
| Potentiometers 42 & 46 | Ohmite, 1K |
| Operational Amp. 45 & 65 | Texas Inst., TL084 |
| Transistors 51 & 70 | Motorola, 2N5192 |
| Transistors 52 & 71 | Motorola, 2N5195 |
| Digital-to-Analog Conv. 64 | Datel, UP8PC |
| Microcontroller 62 | Intel, 8751 |
| Optical Shaft Enc. 61 & 63 | B.E.I., #5V70 |
| Resistors 43 & 47 | Dale, RN55/60C (10K) |
| Resistors 44, 48, 66 & 67 | Dale, RN55/60C (100K) |
| Resistors 68 & 69 | Dale, RN55/60C (200K) |
| Oscillator 59 | 12 MHZ |

Having now described a preferred embodiment of the present invention, it will be apparent to those skilled in the art of acoustic well logging that various changes and modifications may be made without departing from the spirit and scope of the invention as set forth in the appended claims.

We claim:

1. A borehole logging tool for acoustic shear wave logging of a subsurface formation penetrated by a deviated borehole, comprising:
   a) a dipole acoustic energy source mounted for rotation about the axis of the borehole tool to focus the directivity of acoustic energy such that it is perpendicular to the axis of the borehole tool,
   b) at least one axially spaced-apart dipole acoustic energy receiver mounted for rotation about the axis of the borehole tool to focus the reception of acoustic energy in the same direction as the focusing of said source,
   c) a motor mechanically coupled to said source and said receiver for rotating said source and said receiver about the axis of the borehole tool,
   d) means for providing a first signal representing the source and receiver rotational positions relative to the rotational position of the borehole tool within the deviated borehole,
   e) means for providing a second signal representing the rotational position of the borehole tool within the deviated borehole relative to a vertical direction,
   f) a comparator for providing a third signal of the difference between said first and second signals representing the rotational position of said source and said receiver relative to a vertical direction, and
   g) means for applying said third signal to said motor to cause it to rotate said source and said receiver to a position that minimizes said third signal so as to maintain the focus of said source and said receiver in a horizontal direction that is perpendicular to the direction of eccentricity of the borehole tool with respect to the borehole axis.

2. The borehole logging tool of claim 1 wherein:
   a) said means for producing said first signal comprises a first potentiometer having a stator and a rotor, said stator being affixed to the housing of the borehole tool, and said rotor being rotationally coupled with said source and said receiver, the rotational position of said rotor providing for a voltage output from said first potentiometer representing the relative rotational position of said source and said receiver to said borehole tool, and
   b) said means for producing said second signal comprises:
      i) a second potentiometer having a stator, and a movable rotor, said stator being affixed to the housing of the borehole tool, and
      ii) a gimbal mounted weight mechanically coupled to said second potentiometer to move said rotor in response to the vertical pull of gravity on said weight, the rotational position of said rotor providing for a voltage output from said potentiometer representing the rotational position of said borehole tool relative to a vertical direction.

3. The borehole logging tool of claim 2 wherein said comparator is an operational amplifier that subtracts said first signal represented by voltage output of said first potentiometer from said second signal represented by the voltage output of said second potentiometer to provide said third signal representing the rotational position of said source and said receiver relative to a vertical direction.

4. The borehole logging tool of claim 3 wherein said means for applying said third signal to said motor comprises a current amplifying means for rotating said motor in a direction to minimize the difference between said first and second signals.

5. The borehole logging tool of claim 1 wherein:
   a) said means for providing said first signal comprises a first digital shaft encoder fixed to the housing of said borehole tool and to said source and receiver, the rotational position of said digital shaft encoder providing an output representing the rotational position of said source and said receiver relative to said borehole tool,
   b) said means for producing said second signal comprises:
      i) a second digital shaft encoder fixed to the housing of said borehole tool, and
      ii) a gimbal mounted weight mechanically coupled to said second digital shaft encoder to cause said second digital shaft encoder to provide an output representing the rotational position of said borehole tool relative to a vertical direction.

6. The borehole logging tool of claim 5 wherein said comparator is a microcontroller programmed to subtract said first signal represented by the output of said first digital shaft encoder from said second signal represented by the output of said second digital shaft encoder to produce said third signal representing the rotational position of said source and receiver relative to a vertical direction.

7. The borehole logging tool of claim 6 wherein said means for applying said third signal to said motor comprises:

a) a digital-to-analog convertor, and
b) a current amplifying means for rotating said motor in a direction to minimize the difference between said first and second signals.

* * * * *